(12) United States Patent
Paturu (10) Patent No.: US 9,879,517 B2
(45) Date of Patent: Jan. 30, 2018

(54) SUBSEA LEVEL GAS SEPARATOR OF CRUDE PETROLEUM OIL

(71) Applicant: Sumathi Paturu, Birmingham, AL (US)

(72) Inventor: Sumathi Paturu, Birmingham, AL (US)

(73) Assignee: Sumathi Paturu, Birmingham, AL (US)

( * ) Notice: Subject to any disclaimer, the term of this patent is extended or adjusted under 35 U.S.C. 154(b) by 0 days.

(21) Appl. No.: 14/756,973

(22) Filed: Nov. 3, 2015

(65) Prior Publication Data
US 2017/0122091 A1    May 4, 2017

(51) Int. Cl.
*E21B 43/36*    (2006.01)
(52) U.S. Cl.
CPC ................... *E21B 43/36* (2013.01)
(58) Field of Classification Search
CPC ............. E21B 43/0122; E21B 43/36
See application file for complete search history.

(56) References Cited

U.S. PATENT DOCUMENTS

| | | | | |
|---|---|---|---|---|
| 3,548,605 A * | 12/1970 | Armistead | ............... | E02B 15/08 210/918 |
| 4,323,118 A * | 4/1982 | Bergmann | ............... | E21B 33/02 166/356 |
| 4,416,565 A * | 11/1983 | Ostlund | ............... | E21B 43/0122 210/170.11 |
| 5,191,940 A * | 3/1993 | Alonso | ............... | B01D 19/0042 166/79.1 |
| 5,213,444 A * | 5/1993 | Henning | ............... | B01D 17/00 405/60 |
| 5,707,427 A * | 1/1998 | Stockman | ............... | E21B 43/36 95/260 |
| 6,004,385 A * | 12/1999 | Birmingham | ............... | B01D 19/0057 96/174 |
| 8,322,437 B2 * | 12/2012 | Brey | ............... | E21B 33/035 166/344 |
| 8,551,224 B2 * | 10/2013 | Lazik | ............... | E21B 43/01 210/170.11 |
| 2012/0055573 A1 * | 3/2012 | Adams | ............... | F16L 37/62 138/89 |
| 2012/0199000 A1 * | 8/2012 | Elms | ............... | B01D 19/0057 95/258 |

* cited by examiner

Primary Examiner — Matthew R Buck (57) ABSTRACT

A modular 'Subsea Level Gas Separator of Oil Well Effluent' (SLGOE) about the well-head, precludes gas entrainment reaching the rig. The effluent, past the well-head BOP, through ab oil-diversion tube, enters into 'gas-separator' tanks, creating fountain-like up-flow (Sumathi Paturu Up-flow Model). The oil down-streaming into an 'oil-passage tank', is 'styphoned' to the partitioned collection system, past the diversion tube. Massively clustered top outlets of the tanks let off the 'instantly' rising gases. In another embodiment otherwise similarly configured, the oil flows down from the top to the bottom of the tank (Symathi Paturu Down-flow Model). In either model, a gas entrainment instantly reaching the top of the tank(s) is precluded to entrain into the down-streaming oil. Additionally, the immensely pressured gases are attenuated by enormous receptive volume of the tanks and the multiple upstream gas-outlets. A Continuation-in-part application will detail the incorporated emergency measures encompassing a blown-out oil-well.

5 Claims, 4 Drawing Sheets

SUBSEA LEVEL GAS SEPARATOR OF CRUDE PETROLEUM OIL

STATEMENT REGARDING FEDERALLY SPONSORED RESEARCH

Not Federally Sponsored
(No Joint Research Agreement)

SEQUENCE LISTING OF PROGRAMS

NA

This is a CIP Application of the U.S. Pat. No. 9,175,549, titled as 'EMERGENCY SALVAGE OF A CRUMBLED OCEANIC OIL WELL' that is herein incorporated by reference.

BACKGROUND OF THE INVENTION

There are innumerable petroleum oil wells bored into the oceanic floor by highly evolved modern technological devices to tap the petroleum (crude oil) reservoirs. Many oil wells are clustered in the Gulf of Mexico, Arabian sea, and such oceanic grounds, often of significant distance from the coast line, such wells bored through the ocean floor hundreds of feet deeper to the surface waters, to find their way into the underground oil containments spread many miles in area. Oil is collected from the wells into surface tanks in moderate containers, or into receptacles as large as ships.

Historically, the production of petroleum oil from the earth's mantle in the ocean floor has shrouded risk and great hazard, to the natural environment that includes both the marine life forms, and the terrestrial ecosystem adjacent. The greatest hazard is the ignition of the entrained highly inflammable gases like Methane, causing dangerous fires, coupled with the risk of oil spewing and polluting the sea water. Such two man-made calamities at the same time can be uncontrollable with available resources, and utterly devastating to the healthy existence of the earth's planetary life forms. For these reasons, error-proof safety systems in under water bore well digging, and highly trained personnel involved in their operations, are thereof required by law, in all countries engaged in significant oil production. Despite such stringent jaws, system failures and catastrophic results did occur historically, and are still occurring, though the derived remedial measures through each 'adverse-event experience' uniquely different from the other in some form or other, are still nascent, and less than perfect.

Recent event in the gulf shores of Mexico, involving BP oil company's oil well under construction (the Macondo Prospect oil well of the Deep Water Horizon), wherein the ignition of the entrained Methane gas and its fire that continued unstopped for 36 hours, culminated in the collapse of the surface structure of the oil well, resulting in an ever increasing gusher from the source. Several different attempts by the BP oil company's technological team, to contain the spewing geyser from finding its way into the body of water, and into the gulf shores, had failed, mostly due to the inherently limited robotic attempts, involved in a moderately deep aquatic habitat.

As any unforeseen adversity can happen at any time before the completion of the well to its last functional detail, safety measures to weather off such events at any step of the construction, have to be in place, before beginning to undertake such operation. This CIP application and a corresponding PCT application (PCT/US 2016/000091, November 2016) enumerating a model of 'Subsea Level Gas Separator of Oil Well Effluent' include means and methods to be incorporated thereof, beneficially at the most proximate site of the well, and at the earliest time, for dissipating a giant gas bubble in formation, so as to keep the rig from being a venue of danger, difficult to contain. This is one of the plurality of diverse measures described in the original application (U.S. Pat. No. 9,175,549) by the Inventor Applicant, said measures working in synchrony, to weather off any unforeseen event throughout the well construction and well operation. For the information of the said devices otherwise operative, the original application may be consulted. The original application is also a parent application for yet another CIP application (also dated Nov. 3, 2015), and a corresponding PCT application (PCT/US 2016/000090, November 2016), detailing a 'Detachable Island Rig' (DIR), a subject matter that is contextually relevant, being also preventive in scope, of otherwise catastrophic and totally devastating consequences, in the event of a rig-fire.

Many inadvertent and unforeseen consequences were/are inherent to such ventures as the deep sea explorations and the like, shrouded in dangers and never ceasing mystery, and counting always on the tides of nature, yet to be conquered by technological sophistication. Accordingly, the Author Inventor is neither legally liable nor personally responsible for any inadvertent errors, or for any 'adverse' events difficult to differentiate either as a mere association, or as a consequence of the application of the structural and procedural information herein enumerated. Application of this disclosure in different situations, innumerable and unique, is a personal choice. Furthermore, analyzing and adapting swiftly as needed, to diverse situations, still remain as the professional discretion, and the deemed responsibility of the involved company and its associates, participating in the day to day practice of implementing this invention, in part or as a whole.

BRIEF DESCRIPTION OF THE INVENTION

The present invention is drawn to a model of 'Subsea Level Gas Separator of Oil Well Effluent' (SLGOE), devised to be structured about the vicinity of an oceanic oil well. An 'effluent' herein generally refers to admixed emanations from earth's formation of an underground oil containment. In particular, the present invention is designed to separate the components of gas from the liquid and semisolid crude of the effluent, nearly to a total extent, whereby a highly inflammable gas entrainment is precluded to find its way into the rig, historically a known venue of danger. The instant SLGOE model incorporated into the oil collection system, beneficially most proximate to the well head, shall mitigate the occasional failure of the 'Blow Out Preventer' (BOP), to resist the entrained gas under immeasurable pressure, the devised operations of the SLGOE being not to resist such force, but to instantly dissipate it thereof, by a scheme of 'gas diversion' altogether, whereby relatively gas-free elements of petroleum analogs will reach the venue of oil-collection receptacles about the rig site. The invention may not be introduced without the inventor's own endorsement at the outset, that its unsurpassed simplicity is its best asset, in the unpredictable and difficult to contain aquatic habitat.

In one embodiment, the devised model has means for a diversion tube, directing the well effluent from the main oil-collecting tube about the well head, into a set of 3 gas separator tanks, located about the well site. Each gas separator tank has its own oil inlet tube forking thereof from the said diversion tube, said oil inlet tube rising few inches into the gas-separator tank, with its terminal creating a fountain-like up flow of oil (the 'UP FLOW' model) that gravitates down into the tank, to be maintaining a level optimally lower than the raised terminal, a measure aided through a flow control clamp. Each gas separator tank has perforations to its bottom, said perforations letting the down-streaming fountain of oil to flow away lower down, yet into an another compartment having a large outlet tube, directing the liquid oil out, from the tank. Each tank further has widely configured large gas outlet pipes about the top, for the gas that is instantly separated in the spacious milieu of the tank, to be let off, into a separate gas collecting system, leading to specially designed gas receptacles, situated in a safe distance away from the rig. The semisolid and the liquid oil from the gas separator tanks pass through an 'oil passage tank' located yet lower down, and receiving the oil from the top, wherefrom the oil is let out through a 'siphoning' tube to reach the oil collection system at a higher ground thereof, about the well head. Each gas separator tank further contains a 'dispersion' device (either as a 'coil', a 'disc', or as a 'grid' design), to disrupt any block to the perforations of its bottom structure, by the semisolid crude of the effluent.

In an another embodiment, there may be only one tank structured, whereby all the elements of the control and operational measures therein, are effectively minimized.

Figure 3:
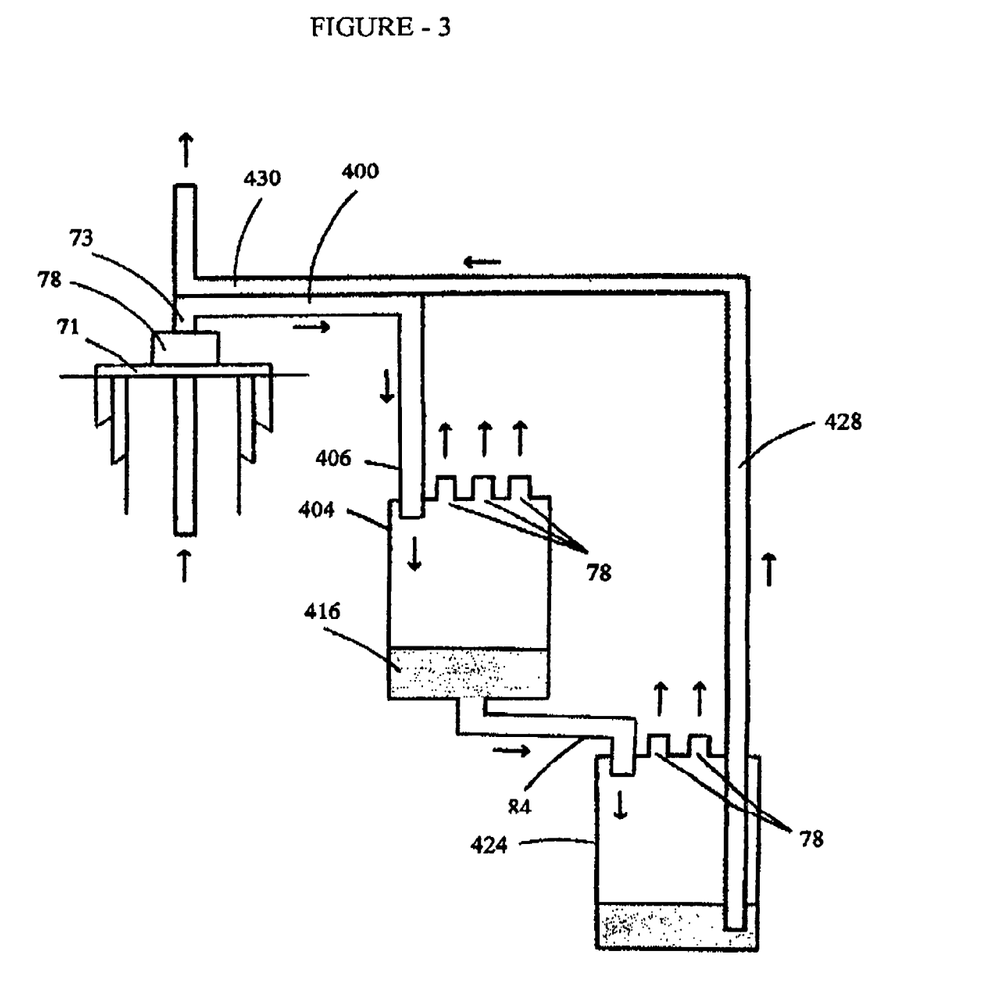
FIG. 3: A Schematic Diagram of a Subsea Level Gas Separator of Oil Well Effluent Unit, Devised as a Down-Flow Model—the unit designed to separate the components of gas from the liquid and semisolid crude of petroleum analogs, and built without an incorporated dispersion-device.

In an another embodiment, the SLOPE unit is devised as a 'DOWN FLOW' model, without an incorporated 'dispersion' device, as shown in FIG. 3.

Figure 4:
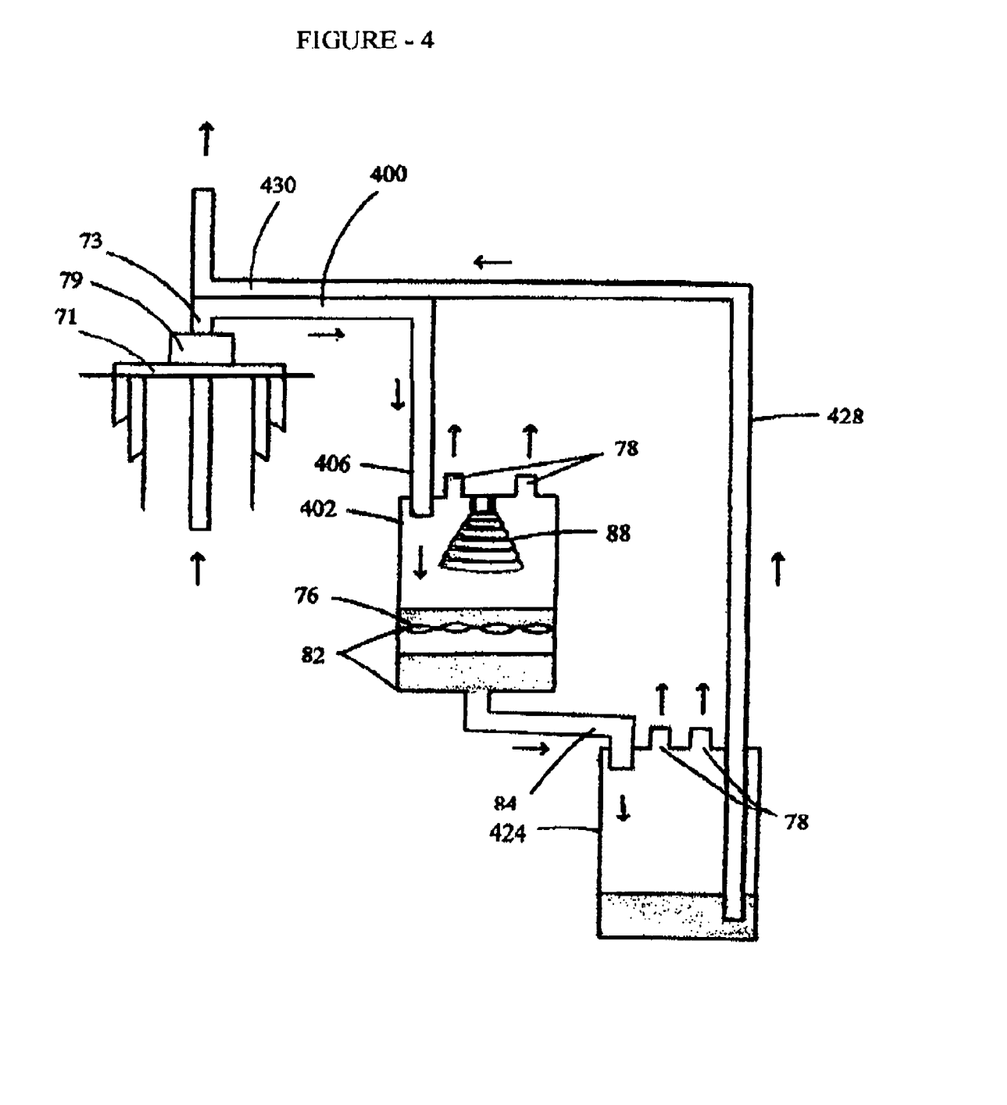
FIG. 4: A Schematic Diagram of Subsea Level Gas Separator of Oil Well Effluent Unit, Devised as a Hybrid Model—the unit designed to separate the components of gas from the liquid and semisolid crude of petroleum analogs, the devised model incorporating both the 'up-flow' and the 'down-flow' designs in-part, and built with also an incorporated dispersion-device.

In yet another embodiment, a 'HYBRID' model incorporates both of the foregoing i.e. the up-flow model and the down-flow model in-part, as shown in FIG. 4.

The SLGOE unit of any model, is structured at a lower excavated oceanic grounds, to facilitate the flow of the effluent into the tanks by gravity, said unit conventionally built into a 'modular capsule' to be lowered into the ocean grounds, and secured thereto, by cemented slabs.

The invention further provides a model of tubing, directed to all the tubular systems thereof, to be having a threaded configuration encompassing the entire lengths, facilitating instant joining or closing of a broken system, following a catastrophic event, aided by means of—(1) 'instant joint structures' having complimentary threading, said structures shaped as I, T, J, L, C, U etc.; (2) 'closing caps', also having complimentary threading, for closing a broken system terminal(s), when system joining is of no option.

DETAILED DESCRIPTION OF THE INVENTION

Figure 1:
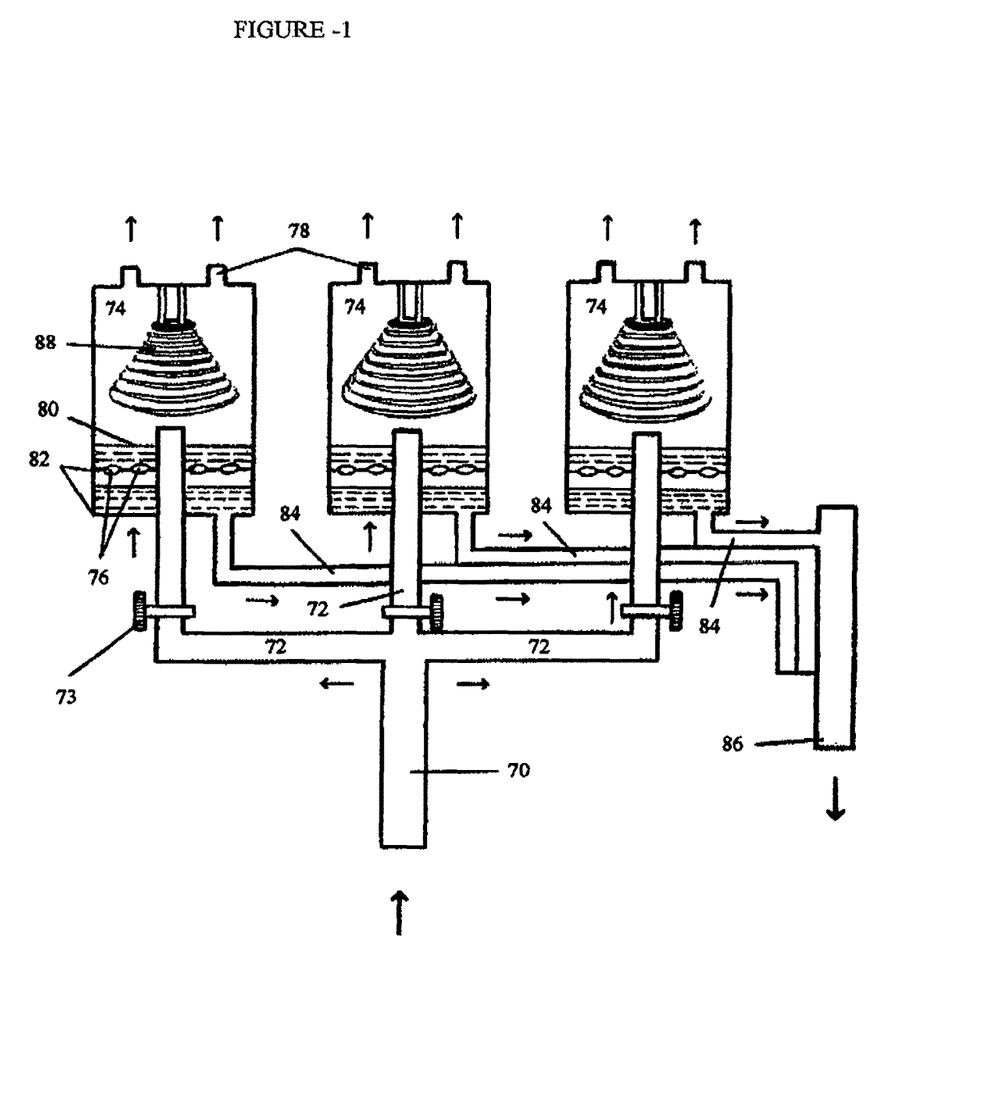
FIG. 1: A Schematic Diagram of a Subsea Level Gas-Separator of Oil Well Effluent Tanks. Depicting an Up-Flow Model—the model designed to separate the components of gas from the liquid and semisolid crude of petroleum analogs. The FIG. 1, elaborating a set of gas-separator tanks also illustrates an incorporated coil dispersion-device, designed to disrupt the semisolid effluent occasionally blocking the flow from the gas-separator tanks.

The following is a detailed elaboration of what was earlier briefed in the section foregoing, with reference to the models of 'Subsea Level Gas Separator of Oil Well Effluent' (SLGOE) Units. An 'effluent' herein is generally defined as 'an admixed emanation from the earth's formation of oil containment, substantially in its natural form, containing gaseous hydrocarbons like methane, liquid and semisolid crude of petroleum analogs, and produced water, extracted in such natural state, usually through a conduit of production tubing'. It is the aim of the device to be functional even before the 'production tubing' is installed, as catastrophic events can happen at this time of well construction, about to culminate in its last functional detail, as was exemplified in the event of the 'Deep water Horizon' oil well blow-out under construction. Conforming to what are illustrated in FIG. 1, FIG. 3, and FIG. 4, the SLGOE is an unit structured (within a 'modular' unit's outer shell, not shown in the drawings), on the oceanic grounds about the vicinity of the well head, particularly designed to separate the gaseous elements thereof, from the liquid and semisolid crude of petroleum analogs. It is configured to mitigate any occasional failure of a 'Blow-Out Preventer' (BOP) to resist a giant entrainment of inflammable gases under high pressure, never to find its way into a rig, a natural venue of danger, igniting an incessant fire by an otherwise insignificant spark, or else, consequent to explosion of gases under tremendous pressure. The model of SLGOE unit herein described is a general outline of an exemplary prototype model, to which technological needs well known to the industry, may be incorporated therein. By virtue of its sheer simplicity of operation, coupled with a design wherein 'nothing is left to chance', the SLGOE unit is ideal for its destined function, and can be easily set forth on the oceanic grounds about the vicinity of the well head. The proposed model is most beneficial if incorporated thereof at the earliest time feasible, and at a site most proximate to the well head.

FIG. 1, FIG. 3, and FIG. 4, as illustrated, show such outlined model which is simple in its operation, but is devised to be, as can be seen in the drawings, contrastingly different from the basic model of flow-control by a 'valve' mechanism, said difference pursued, because such valve mechanism at times failed to contain, and let out the inflammable gases under high pressure. The valves are proven ingenious inventions, however, in certain set ups as in oil wells, occasionally with immense pressures not elsewhere encountered, the valves inherently lack provisions thereof, to 'resist' such pressures, an example, that 'nature's might' is yet to be conquered, despite the growing technological sophistications. The valves are probably better suited to resist pressures originating from within narrow caliber conduits, such as a 'production tubing', at least in few instances of unexpected pressures. However, when an innermost casing conforms to an oil conduit, as—(1) before a well completion to its last functional detail, a situation similar to Deep Water Horizon 'Macondo prospect' Oil well blow out, and (2) in high production wells, when high flow is planned, without the well destined for the incorporation of a 'production tubing'—the needed resistance of the BOP to be exerted in both instances, is against a well containment under greatest of pressures. It can be compared to a narrow door controlling a main entry vs. wide gates fully open, when the flood of onslaught is naturally through a higher dimension. Most, though not all BOP failures probably happened/happen under such circumstance. Henceforth, it is prudent that yet another mechanism in conjunction be set in place, to mitigate BOP failures and the resulting calamity, especially for a so far insurmountable 'situational calamity', before a well completion.

An Up-Flow' Model of the SLGOE Unit with a Dispersion Device

The FIG. 1, not drawn to scale, illustrates the schematic Up-flow model of a 'Subsea Level Gas Separator of Oil Well Effluent' (SLGOE), named as 'Sumathi Paturu's SLGOE Up-Flow model' (Sumathi Paturu's UPF model), effectuated on the ocean grounds, in the vicinity ea well head, FIG. 1 shows an oil diversion tube 70, situated far beyond its origin about the well head. The said tube 70 is structured to further fork into 3 oil inlet tubes 72, each entering through the lower part of a moderately sized metal (preferably steel) tank 74. Typically, the bottom of each tank 74 has large sieve-like perforations 76 throughout, whereas the top of the tank is fitted with widely configured gas outlet tubes 78, studded all about the available space of the top. Such art arrangement of voluminous out flow of the gaseous components is highly efficacious, when a giant gas bubble is encountered. Each tank contains a relatively smaller additional compartment 82 below the level of the sieved-bottom, and the said compartment is further fitted with a bottom oil-outlet tube 84, its diametric configuration devised to be wider than the well's incorporated 'production' tubing.

The forked oil inlet tubes 72 entering the tanks 74 are structured to rise few inches (about 8-10) from the bottom of the tanks, to facilitate a fountain like drop-flow into the bottom of the tanks, as the oil overflows out of the tubes 72. Due to such structural arrangement, as the oil gas effluent enters the tanks 74 through the tubes 72, its 'over-flow' is tossed into the spacious milieu of the tanks, whereby the gaseous components of the effluent are fated to instantly ascend to the top of the tanks, and the semi-solid and liquid oil, to instantly gravitate down, as dictated by jaws of natural properties. This separation is instantaneous, in marked contrast with a voluminous column of an effluent occupying a tank (an otherwise typical model), as time is also of essence, in preventing the gaseous elements finding their way into the oil collection system downstream. In the devised model, even with regard to a liquid gusher, its force is attenuated by the said instant separation of the gases, whatever be their proportion (as yet deemed to be contributing to the force), whereby such attenuated gusher can be at least tackled by the surface BOP. The crude of petroleum analogs overflowing down the tubes 72, finds its way through the wide perforations 76 in the bottom of the tanks to the compartment 82 below. The compartments 82 fitted with the oil outlet tubes 84, let out the oil continuously. The natural up-flow of the gaseous components of the effluent rising to the top of the tank, are led into the gas outlet tubes 78, the latter clustered all through the available space of the top. There from, the gases further flow into a separate gas collection system, and then into the gas receptacles situated in a safe distance away from the rig. Such an arrangement of voluminous gas out flow from the tanks 74 is highly efficacious when a giant gas entrainment, even under tremendous pressure, is encountered, as the greatest volume effectively dissipates the greatest of pressure, and the descent of gas even from such high pressured giant bubble to reach the bottom of the tanks, is extremely unlikely. The gas collection system connected to the specially devised receptacles, have provision thereof, to deal with gases under high pressure. The oil outlet tubes 84 from the bottom structures of all the tanks join a single collecting tube 86, just outside the tanks. The tanks 74, to be best suited for their functional demands, should be located at a lower ground than the point of origin of the effluent 'diversion tube' about the well head structure. The lowered ground level is deemed optimal thereof, if the terminals of the inlet tubes 72 into the tanks 74 are at lower horizontal level than the generally horizontally originating 'diversion tube'.

The separated crude petroleum analogs flowing out into the collection tube 86 are diverted into yet another 'oil passage' tank, effectively located at a lower level, wherein the oil from the tube 86 flows down, from the top. FIG. 4, depicting a closely configured 'Hybrid Model' shows such 'oil passage' tank 424, located at a lower level, wherein the oil from an oil outlet tube 84 flows into the 'oil passage' tank from the top. From this tank, oil is returned to the main collection tube/production tube 73 about the well head 71, past the BOP 79, by mechanical means thereof. Such means, for example, are aided by jaws of hydraulics, conforming to the 'siphoning' principle. In this instance, a tube originates from the bottom liquid column of the 'oil passage' tank, then to reach a higher level about the well head 71, directing the return of oil flow by the 'siphoning' principle. This incorporated model of 'oil passage' tank completely alienates the gas separation tanks 74 from the 'natural drawing force' (the latter as an effect of the 'siphoning' principle), whereby the gaseous components will not be otherwise sucked into the down-stream liquid oil collection system, from the tanks 74. Such drawing force created by the 'siphoning' principle is exclusively directed to the 'oil passage' tank, in effect, returning the oil to higher grounds about the well head. The 'oil passage' tank is also set forth with optimally sized gas outlet tubes 78 about the top (to join the main gas collection system), whereby any gaseous components of significance, can be furthermore separated. The gaseous separation is deemed instantaneous in the devised arrangement of the 'oil passage' tank also. A 'transition' tank, located at a lower level, to receive the well effluent first, and then to direct it to the gas-separator tank(s) 74, can also be incorporated into the system to buffer the transition, and further to make needed interventions smoother.

It is obvious that these different functional tanks are arranged stepwise wherever needed, to facilitate the forces of gravity, and once these natural forces are structurally made operational at the outset, they need no further technological mending or monitoring thereof, except what is the 'security routine'. The tubes 72 are fitted with external control on/off devices 73, to stop entry of the effluent into any tank 74, when desired. The control devices 73 can also regulate the quantitative oil inflow in such a manner that the level 80 of the oil in the tanks 74 is kept optimally below the terminals of the tubes 72 in the tanks 74, under usual circumstances, as shown in the FIG. 1. For new wells with very high flow, all tanks 74 are operational. When flow slows down, only 1 or 2 functioning tanks are sufficient. The control devices 73 of the tanks can extend to the exterior of the SLGOE modular shell, so that the closure of a tank 74, or its volume flow control can be therefor regulated from outside.

The perforations 76 of the sieved bottom of the tanks 74, being devised to be slightly wider than the diameter of the production tubing, the globs of crude oil that could flow through the 'production tubing', may not be generally expected to block the perforations 76 of the tanks.

In yet a different embodiment, there may be only one structured tank 74, wherein all the operative components, control components, and monitoring components, in effect, can be substantially minimized. In this model, the flow control clamp being single, can be structured about the origin of the oil 'diversion' tube from the main oil conduit about the well head. The outlet flow down-stream yet shall go through the 'oil passage' tank, and then be returned to the collection system by stream yet shall go through the 'oil passage' tank, and then be returned to the collection system by siphoning principle, as described in the foregoing. Structuring only two tanks is also an option. 'Water seeks its own level' was the essence of Aristotle's principle long ago. In five words, it had effectively summated volumes. Contextually, the principle was directed to the hydraulics governing the 'siphoning' principle. It connotes that an isolated but connected body of water maintains, in all its containments, the same horizontal level, and in effect, water may not be diverted to a higher level thereof, except by means of the 'siphoning' principle. This forms the basis for the SLGOE unit and all its extensions need be located at a lower level than the point of origin of the diversion tube 70, about the well head. It is for the reason that the terminal flows of the inlet tubes 72 are part of the isolated body of water, yet connected to the point of origin of the diversion tube 70 about the well head, and hence the oil column will not rise and emanate the fountain flow, unless the tubes 72 in their entirety, are at or about a lower horizontal level than the point of origin of the diversion tube 70. It is functionally assuring to be at a lower level. The fountain flow need not be a formation of a typical up-flowing jet, as in the aesthetically configured landscapes, but there should be rise of the effluent column, with a profusion of overflow therefrom. Such flow into the inlet tubes 72 are best achieved by the natural forces of gravity in this setting, whereas the terminal flow of the oil up-stream into a higher ground from the 'oil passage' tank, in effect, is best achieved by the 'siphoning' principle. It may be understood that the diversion tube 70 shown in the FIG. 1, positioned at a lower level than the oil inlet tubes 72, is the most distally drawn oil tubing reaching the tanks 74, and may not conform to the diversion tubing at its point of origin about the well head, in a higher ground thereof. Those skilled in the hydraulic engineering are well versed with these governing principles that need no further enumeration, The ocean grounds may need some excavation to accommodate the SLGOE unit, and it further needs to accommodate the 'oil passage' tank at even a lower level. It should not be hard for the oil explorers, as digging even deeper being their expertise.

The Video Monitoring of the Gas-Separator Tanks

In any model of the SLGOE unit, the gas separator tanks will be provided with a video device and/or a sonar device to monitor the state of affairs within the tanks, and are designed to be operated by a solar battery power source. The video device, a 'night-vision' model, is provided with wipers to clean its lens periodically and as needed. Said lens is structured with a frame around, that is in flush with the lens, for an easy wipe. Alternately, the gas-separator tank can have an 'air-tight' glass window (that will not let in the atmospheric oxygen) near its top (in a side away from the oil inlet tube in a 'down flow' model), whereas the video device is situated just outside the tank, and is positioned with a downward incline of the lens side of the device, facing the window. The window door only opens to the interior of the tank. The opening mechanism is similar to the conventional 'automated doors', wherein they can be opened, and when left ajar, they are closed automatically after few seconds. The video when needs to document the tank-interior, its projectile structure moves forwards to push on a 'control button' to open the window door, the lens tubular then zooms forwards, and the device moves in all directions picturing the tank. When stopped, the lens moves back and the instrument retreats, as the window door closes in few seconds. The devised mechanism facilitates a clear picturing of the tank each time, without smearing the camera lens. As the whole SLGOE is within a modular unit, momentarily opening the gas separator tank-window, would not lead to any undue consequences. The video within the 'modular' additionally documents that the tank's window door is properly shut.

A Dispersion Coil Device of the SLGOE Unit

Optimally, each tank 74 of the 'Subsea Level Gas Separator of Oil Well Effluent' (SLGOE) unit has a spirally wound 'dispersion coil' unit, preferably in steel, fitted to a top structure of the tank 74, by two supporting vertical rods about a ring structure, the latter attached to the top coil of the 'dispersion coil' 88. The 'dispersion coil' with its spiraling-string conforming to a malleable caliber of sufficient recoil, is designed in an inverted funnel configuration, its bottom coil devised to be the widest, and the uppermost coil the smallest. Said 'dispersion coil' unit moves up and down when operational (in case a block to the down-stream oil flow from the tanks 74 is noted, or suspected), its spring-action with axial downward thrust of all coils, disrupting thereof any semisolid crude blocking the bottom perforations 76 of a tank. The inner dimension of the uppermost coil (with the smallest dimension of all) of the spiral is optimally designed to be wider than the outer diameter of the oil inlet tube 72, as the said coil traverses in closest proximity around the oil inlet tube 72, in its axial motion, when the device is operative. The coil-device can also be operational in continuum at preset intervals, that is, at about every 3-5 minute intervals thereof, in effect conforming to 4-5 axial motions each time, each axial motion including a complete downward and upward movement. With many bottom perforations of the tank, only few of them, if at all, are expected to be blocked at any time. Additionally, any globs of the crude blocking the perforations, and hence sufficiently disrupted in their size by the coil device, will never block the outlet tubes 84, and thereby a continuous oil flow down-stream is always ensured. The two supporting rods from the top of the tank attached to the uppermost coil of the device, as illustrated in FIG. 1, are designed to be mostly positioned outside the tank, as when the 'dispersion coil' is nearer to the top, whereby the axial motion of the rods therefor conform to external controls, also structured outside the tank (not shown in the drawing).

A Dispersion Disc Device of the SLGOE Unit

Figure 2:
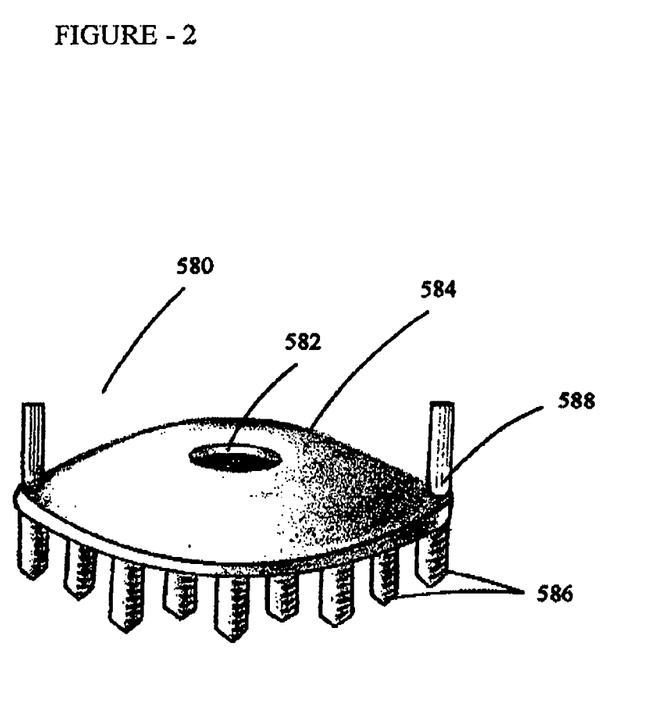
FIG. 2: A Schematic Diagram of a Model of Oil-Disperser as a Disc-Device—the model to be incorporated thereof in a gas-separator tank of the Subsea Level Gas Separator of Oil Well Effluent unit, said disc-device configured to disrupt the semisolid effluent occasionally blocking the out-flow from the gas-separator tanks.

In yet another embodiment, the coil device 88 of each gas separator tank 74 is replaced by a metal disc device 580, shown in FIG. 2. The disc device 580 is preferably made of steel. It consists of a disc 584, with a central aperture 582, the diameter of the aperture configured to be far wider than the outer diameter of the oil inlet tube 72. The disc 584 has an upper surface, and a lower surface, and it is incorporated into a top structure of the tank 74, by two vertical rods 588, attached to its upper surface. The rods 588 are positioned in equidistance, and are designed for axial motion downward and upward in a pre-configured manner thereto, at frequent intervals, or as required thereof, when a block to the oil outflow of the tank 74 is suspected down-stream. The lower surface of the disc 584 is structured to have multiple spikes 586, located in a positional configuration that corresponds to the position of the bottom perforations 76 of the tank. The cross sectional diameter of the spikes 586 is devised to be optimally smaller than the perforations 76, as, in the axial downward motion of the disc device 580, the spikes 586 axe designed to pass through the perforations 76, wherein any globs of the semisolid crude blocking the perforations are thereby disrupted. In conformity to such function, the spikes 586 located nearer to the center, are structured longer, whereby all the spikes in their lower free ends are in a same horizontal plane. The central aperture 582 of the disc is sized far wider, so that in the axial motion of the device 580, it is positioned around the oil inlet tube 72 in an easy accommodating manner, letting an easy ascent of the up-flowing gases, separated from the fountain-flow of the effluent, to reach the gas out-let tubes 78 at the top. The disc-device when operational in continuum at preset intervals, that is, at about every 3-5 minute intervals, it conforms to deliver a series of 4-5 axial motions each time, each axial motion including a complete downward and upward movement. The metal disc 584 as devised in the invention has an incline, rather than a flat design of a CD-ROM disc. That is, it is supported from the top of the tank 74 like a lamp shade, with a perceptible downward incline. In this preferred configuration, the semisolid crude of the effluent falling on to the top of the disc 584 in its axial motion about the level of the oil inlet tube 72, will therefor flow down, and not settle on the top surface, by virtue of the devised downward incline.

The disc 584 is sized to be not spreading through the whole of the tank top, with allowance for a substantial space around, for the ascent of the gases thereof. The rods 588 are devised to be mostly positioned outside the tank 74, as when the disc 584 is nearer to the top, wherein their axial motion is subject to external controls therefor, structured outside the tank 74.

A HEMI DEVICE DISPERSION MODEL OF THE DISC—in an another embodiment, the disc device 580 is made with hemi structures of the disc 584. In this model, the device otherwise conforms to the similar structural and functional design of the whole disc, except that the complete upward and downward motion of the hem structures alternate i.e. after the downward and upward motion of one hemi structure is concluded, conforming to a series of 4-5 axial motions, the other will initiate its downward motion, also conforming to a series of 4-5 axial motions thereof. The design has an added advantage that the semi-solid effluent easily slides down from the top of the hemi-devices. It also facilitates better ascent of the up-flowing gases, even when the hemi devices are operational.

A GRID DISPERSION MODEL OF THE DEVICE—in an yet different embodiment, the device, structured either as a whole or as a hemi device, is configured as a widely spaced thin net of a grid, about which the spikes are strategically positioned at the bottom, in the same manner they are configured in the disc model.

A Down Flow Model of the SLGOE Unit without a Dispersion Device

A down-flow model, named as Sumathi Paturu's SLGOE Down-Flow Model (Sumathi Paturu's Do. F model), is illustrated in FIG. 3, said figure not drawn to scale. The following describes the FIG. 3 of the SLGOE unit about the well head vicinity, wherein a single tank is exemplified, with also the pertaining tubular connections included.

The SLGOE unit as a 'down flow' model is built without any oil 'dispersion' device. In this model, also made of steel, the oil effluent directly comes from the oil 'diversion tube' 400, off shooting from the collecting tube/'production tubing' 73, past the well head 71, and the blow-out preventer (BOP) 79, without a devised 'transition' tank. The effluent enters from the top of the 'gas-separator' tank 404, through an oil 'inlet tube' 406, and flows 'down' into the bottom of the tank 404. The incorporated oil 'outlet tube' 84 at the bottom of the tank 404 is large sized, and there are also large sized multiple gas outlet tubes 78, clustered all through the top of the tank. Oil flows from the outlet tube 84 of the 'gas-separator' tank into the 'oil-passage' tank' 424, positioned yet at a lower level, so that the effluent 416 enters also from its top, through the tube 84. The 'oil-passage' tank' 424 ensures further separation of gaseous elements, that rise to the top gas outlet tubes 78, also configured large, and clustered all about the top. The 'oil-passage' tank' 424 has an incorporated 'syphoning' tube 428 rising from the bottom oil column of the tank 424, to be let out at the surface, to reach the oil collection unit about the well head 71, as a 'merging' tube 430, joining just above the originating 'diversion' tube 400. Evidently, the oil collection system about the well head has complete separation thereof, between the 'merging' tube 430, and the 'diversion' tube 400. This SLGOE unit, as was mentioned, may or may not have an incorporated 'transition tank' preceding the 'gas-separator' tank 404. The gas collection tubes 78 that are not only large but are fully clustered, as mentioned, occupying all the available space of the top of the tank, facilitate such exceeding volume to instantly dissipate the exceeding pressure of a gas entrainment, that the descent of even a very high pressured giant bubble from these, to reach the bottom of the tank, is extremely unlikely (most of the gaseous elements originate in the top of the tank to start with, only some separated lower down, as an added advantage, in this model). Such arrangement is precisely directed to the rare occasions when such giant gas bubble is encountered, with the unit devised to instantly subdue such high-pressured encounter, as also, the effluent inlet tube is only one, whereas the equally sized gas outlet tubes positioned upstream are many more, the generally encountered inflammable gas methane being far lighter than air (any of the operational tanks, however containing no 'atmospheric air'), naturally rising to the top. The oil inlet and outlet tubes designed as big as needed, ensure no obstruction to the oil flow, and an 'oil-dispersion' device is not incorporated therefor into this model, making it simpler, not needing frequent monitoring of any nature, other than what are the oil-company's security routines.

A 'Hybrid' Model of the SLGOE Unit

The FIG. 4 depicts a schematic 'Hybrid model' (Sumathi Paturu's Hy. model), not drawn to scale, wherein the 'up-flow' model is incorporated into the 'down flow' model in-part. It shows the oil diversion tube 400 at its origin about the well head. The said tube 400 is structured to be leading into a moderately large metal (preferably steel) gas separation tank 402, entering through its top, as its inlet tube 406. The bottom of the tank 402 has wide sieve-like perforations 76 throughout, whereas the top of the tank 402 is fitted with widely configured gas outlet tubes 78, clustered thereof, all through the available space. The tank contains a relatively smaller additional compartment 82 below the level of its sieved bottom, and the said compartment is fitted with a large bottom outlet tube 84, its diametric configuration devised to be wider than the well's incorporated 'production tubing'. As the 'hybrid' model incorporates elements of both the 'up-flow' and the 'down-flow' model in part, in FIG. 4, alike elements are designated similar numerals therefor. As soon as the oil gas effluent enters the gas separation tanks 402 at its top, flowing through the tube 406, it is tossed into the spacious milieu of the tank, whereby the gaseous components of the effluent are fated to instantly reach the top of the tank, and the liquid and the semi-solid crude, to instantly gravitate down, to the bottom of the tank 402, wherefrom it finds its way through the wide perforations 76 in the bottom of the tank, to a compartments 82 below. The compartment 82 fitted with an outlet tube 84 lets the oil out continuously from the bottom. The natural up-flow of the instantly separated gaseous components of the effluent, leading into large sized outlet tubes 78, are connected to a separate gas collection system. The bottom oil outlet tube 84 from the tank 402 is diverted into an 'oil passage' tank 424, located yet at a lower level, wherein the oil from the tube 84 flows into the tank' 424, from the top. The 'oil passage' tank is also fitted with widely configured gas outlet tubes 78 in the top (to also join the gas collection system), whereby any remaining gaseous components of significance can be further separated, such separation also deemed instantaneous. From the 'oil passage' tank 424, through a syphoning tube 428 originating from its bottom liquid column, oil is returned through a merging tube 430, to the oil collection system/production tube 73 about the well head 71, past the BOP 79, by mechanical means thereof, aided by the 'siphoning' principle, as discussed earlier. It is an option, not a necessity, to have the ° transition' tank in this model. A gas dispersion device 88 is shown in the top of the gas separator tank 402. The instantly separated gaseous elements reach to the top of the tank with great ease, to be let into the gas the gas collection system (most of the gaseous elements originate in the top of the tank to start with, only some separated lower down, as an added advantage in this model, as it was also in the 'down-flow' model).

The Unique Plan of Gaseous Separation in the Devised Models— in the devised models, either the 'up-flowing' or the 'down-flowing', the separation of gaseous components is instantaneous, and the completely separated gaseous elements, as dictated by jaws of nature, are destined to reach the top of the tank with great ease, the gaseous elements being originating in the top of the tank to start with, in the down-flowing models. Indeed, in a giant gas entrainment, there needs no separation, but for the giant gas bubble to be instantly diverted to the top, and not to the bottom of the tank. An enormously higher volume of reception upstream, greatly subdues the enormous pressure of the gas entrainment, the devised disproportionately voluminous out-going gas-collection tubes, compared to a single incoming tube, so ensuring a rapid reception thereof, and an instantaneous diversion therefrom. In this instance, substantial part of the giant entrainment, precisely due to its massive size, compounded by its massive pressure, otherwise could have instantly entrained into the downstream oil-outlet also. Any of the gaseous elements, if at all finding their way into the oil outlet tube lower down, are by all means not high pressured, or else, can be optimally controlled by the rig level BOP.

The 'Diverted Blow-out' and the 'Diverted Explosive Fire'—unlike the 'well blow out' and a 'rig level explosion fire', consequent to BOP failure, in the devised models, due to the complete attenuation of the high pressured gas entrainment at the level of the gas outlet pipes of the SLGOE unit, the diversion of such gaseous elements happens in a controlled manner thereof, so that a high pressured gas explosion is unlikely. Even if the pressure is not optimally controlled, the 'blown-out' gas entrainment and the explosion-fire are instantly diverted from the vital sites, that are, the well and the rig respectively, and an explosion with the consequent fire, if at all happens, will happen at the site of the terminal gas receptacles, away from the well and the rig, however, in this instance, the uncontrollable spewing of the oil into the aquatic and then into the terrestrial ecosystem is also precluded, as the gas receptacles, to all extent, are devoid of the crude petroleum oil.

The Modular Protective Enclosure of the SLGOE Unit

In view of the utmost functional importance of the SLGOE unit, it is prudent that the whole unit is in an enclosed protective structure. It can be easily actuated by structuring the unit in an enclosed 'modular capsule' of pre-configured sizes, with an appended 'SLGOE tubular' on one side, the unit made of steel in its entirety. With all the inlets and outlets capped, it traverses the oceanic depth, to be deployed onto the excavated grounds about the well head, with provisions thereof, for secure ground fixtures. The needed stepwise incline of the tanks is configured within the modular capsule, whereby the base of the modular itself conforms to a horizontal structuring, for its easy and secure stationing on the excavated grounds. The 'SLGOE tubular' configured in standardized lengths, is devised for an access to the 'drilling conductor' of the well just above the conductor's base piece, through the upper terminal of the said tubular, the latter also having reinforcing vertical supports to the ocean grounds.

The 'modular' is structured with retractile ° shopping cart' wheels (caster wheels) to its bottom, for its precise stationing. The 'SLGOE tubular' at its lower terminal having access into a side wall of the 'SLGOE modular', is in flush with its base to be also resting on the ocean grounds. The earlier described video and/or sonar monitoring devices are incorporated into the modular also, in addition to their incorporation about the tanks. It is a better provision that the modular also has a glass window, protected outside by a bolted metal window. The solar equipment power sourcing these monitoring devices is structured outside the modular (with protective enclosure), ensuring the needed sun exposure. The modular unit is equipped with the conventional hooked and ringed structures, strategically placed in its outer shell, for the needed anchoring manipulations, for its secure stationing. Threading in entirety, of the unit's tubing system, is as described at the end of this discussion.

The whole 'SLGOE modular' unit is stationed at a lower level than the originating 'diversion tube' about the well head, wherein the said 'SLGOE modular' unit encompasses the 'transition tank', the 'gas-separator' tank(s), and the 'oil passage' tank, with the terminal "syphoning" tube incorporated into the 'oil passage' tank. The tanks of the unit as configured, can be set forth fairly closer to each other, that the modular unit as a whole would be less space occupying on its excavated grounds. The needed excavation can be easily effectuated by dynamite blowing, involving a small area, of the ocean grounds, a process well known to those skilled in hydraulic engineering. It follows, it is a good idea that the ground is prepared for the SLGOE unit stationing before digging the oil well, as it ensures the future well safety. Furthermore, perfect ground stability with no shaken or loosened earth's mantle should be ensured thereof, in the vicinity and in the site of well digging. In older wells, the unit is planned at a safe distance from the well.

The excavation of the oceanic grounds is better done as a gradually sloping wide saucer shaped area with a central flattening, rather than structuring it as a confining vertical tub. The former model provides for visualization, access, and for the wheeling of the modular. Obviously, a cemented path, to be maneuvered by the modular wheels, must be paved from the periphery to the flattened center of its stationing. The 'SLGOE tubular', in its length, is tailored to the well's geography. As even few centimeters of disparity will be problematic, the needed approximate length of the tubular should be known, erring for a longer size than shorter, whereas the needed finer adjustments are done at the time of its stationing, by manipulating the central flattened ground already excavated. It follows, though the ground is preps earlier, the stationing of the 'SLGOE modular' is done about the time of deploying the drilling conductor. The drilling conductor should have complimentary hardware provisions, for articulating with the 'SLGOE tubular'. Obviously, the 'SLGOE modular' is accessed thereof, through the drilling conductor.

As the oceanic waters about the well head are subjected to the extreme weather conditions of cyclones, storms, and hurricanes as elsewhere in the ocean, the whole of the modular shell is secured by sturdy metal chains on its three sides to the adjacently erected cement slabs, the latter built by cement blocks put together by QUIKRETTE, the 'Hydraulic Water Stop Cement' (number 1126) with quick consolidating properties, and available as above or below grade strengths, suitable for quick setting in 3-5 minutes. Such detachable yet strong anchoring allows a replacement of the unit, when needed. As an alternative to the chains, the modular can also be cemented through strategically placed metal bar or rod structures, for needed stability during the occasional perturbations of the ocean. It was noted earlier that the modular is fixed by ground fixtures, and also steadied on one side by the 'SLGOE tubular' that s resting on the ocean grounds.

Said modular capsule is a great security provision, apart from the acquired structural stability to its interior devices in view of their stepwise arrangement, so that the unit as a whole can withstand any turbulences of the oceanic ecosystem. It furthermore facilitates the ease of monitoring and the ease of interventions, in a difficult to contain deep sea habitat.

An alternative plan—in case excavation of the oceanic grounds is of preferred by the oil company, especially on ocean floor with an already dug well, it can install the modular on unexcavated plain grounds, but in this instance, the oil 'diversion' tube and the 'merging' tube need to be effectuated at a higher 'optimal level' about the production tubing/collection system. Said higher 'optimal level' planned at least few inches above the roof of the modular, the latter being positioned on plain grounds, is functionally assuring. For older constructions, at the preconfigured higher level, the articulating hardware of the 'SLGOE tubular' needs to be securely cemented first to the drilling conductor, to which it can also be bolted for needed strength, making it a watertight articulation. Thereafter, optimal dimensions of the conductor on the inside are drilled out, to establish a passage, without compromising a water tight articulation. There should also be a passage through the riser, wherefrom a communication with the oil collection system is established thereof. The 'receiving' ground preparation for steadying the unit on the plain unexcavated ocean grounds is yet necessary, effectuated in a like manner, as mentioned in the foregoing.

The Vulcanized Rubber as the Structural Constituent

It can be noted that all the rubber washers or any assembly devices if rubber, incorporated in the oil gas separator unit, and in the modular unit, are made of vulcanized rubber, the only type that can resist the degrading attack of the petroleum analogs.

The Utilitarian Merits of the Invention

The proposed models as a whole, by any standard, encompass simpler methods that can be effectuated on the oceanic grounds in the vicinity of the oil well, to separate the regularly encountered oil gas mixture, or occasionally encountered greater a amount of admixed gas under significant pressure. The target is to mitigate the dangerous calamities of gas entrainment, rather than for 100% refining measures of oil gas separation that is otherwise pursued by the 'oil production plants' engaged in exclusive crude-oil separation (the 'Oil Refineries') by means of a highly involved process of 'Fractional Distillation'.

The SLGOE device is obviously intended to preclude possible entrainment of inflammable gases into the petroleum collection system, and then into the rig thereof, setting up a dangerous fire by an otherwise insignificant spark, inherent to the rig for whatever reason. Compared to the means and methods effectuating enormous resistance, as a function of the conventional BOP, the means and method steps described about the SLGOE unit seem too simplistic, but there is an inherent difference that is taken great advantage of, to propose such a model. The principal involved in the BOP, is to ultimately resist the enormous pressure of a giant gas bubble of entrained gases that it can fail to resist, as in the BP's Deep Water Horizon Oil Well blow-out. The SLGOE device makes no effort to contain such gas pressure, simply for the reason that at certain thresholds, it is clearly uncontainable. Accordingly, it is prudent to let out (divert) such pressure, totally if possible, and in case it is only partial, at least the opposing pressure is optimized, or the surface BOP near the rig level to be able to control, and prevent a blow-out. Obviously, it s generally not a sure plan of the SLGOE device to control a high pressured liquid oil-gusher from the oil well. However, even a high pressured liquid-gusher if had contained admixed gases of proportion, it is thereby attenuated for the surface BOP to tackle, with its occasional failure possibly precluded.

The SLGOE device can be incorporated into the oil collection unit in any manner feasible, and considered as the best by the involved oil company, however, the ocean grounds about the well head being the most beneficial venue, as thus far emphatically suggested. The oil conduit about the well head, by any suitable means, can be structured to have a proximal 'diverting' oil-outlet tube separated from an immediately distal 'merging' oil-inlet tube see FIGS. 3 and 4), so incorporating the SLGOE unit into the oil collecting system, subject to separating the oil and the gas at the source, at the earliest feasible occasion of the well construction, precluding a giant gas bubble entering the rig at any time through-out the rig operation.

For the BOP to control pressures involving most powerful of ruptures, in all high volume wells where such events can be reasonably expected, it is a worth trying option to divide the oil line into multiple outlet conduits within the innermost casing and each outlet conduit structured to pass through its own stack of BOP, wherein each stack can tackle the divided power of the gusher, reduced to half, or to one third of its strength. It implies, it is a good practice to never allow a production casing (the innermost casing) to be a functioning oil-conduit in high volume wells, a practice that takes out at the outset, probably an unrecognized brewing recipe for danger. It is of suspect, that the catastrophic events had historically happened when the oil companies had indulged in such ambitious though undesirable practice, or else, the must have had happened before the well completion to its last functional detail.

Other incidental utilitarian advantage for the oil companies is—claiming a substantial amount of gaseous components of the well effluent, instead of the 'oil refineries' doing so. Why it is substantial is, once the effluent is thrown into the milieu of the tanks (including the 'oil passage' tank), the gaseous elements can only rise up to the tank to be let off in entirety. Only small bubbles intimately admixed with semi-solid effluent are left to be separated by the oil refineries. These seemingly unwanted elements are highly utilitarian for other purposes that the gas companies can also invest in, which probably they are already doing to some extent, as indeed they extracted these from the underwater oil containments.

Threaded Instant Joint Configurations and Closing Caps

The invention further envisions a model of tubing directed to all tubular systems, and herein devised methods of instant system joining or closing, for all future oil exploration units, or as a replacement-tubing for existing units. The said model of tubular systems is structured to be having a deep threaded configuration on the inside or the outside, of all the tubular systems involving the well, the rig, and any structures in the vicinity, said threading incorporated through the entirety of any suitable tubing, small or lengthy, facilitating instant joining or closing of a broken or otherwise compromised system, aided by means of—(1) 'Instant joint structures' shaped as I, T, J, I, C, U, Y etc. with complimentary threading, and having a straight or nested configuration, to be inserted thereto, for the system joining, when a conduit line is broken and interrupted. The functionally uninvolved middle part of the said instant joint structures are enlarged externally for easy handling even by the robotic maneuvers; (2) 'Closing caps', also with complimentary threading to their stems, to be threaded thereto, for closing a tubular system, when system joining is of no option. Said 'Closing cap' with the devised stem articulates with the broken tubing for a closure, wherefrom the functionally uninvolved external part of the terminal stem enlarges to a tubing double the size or more, ending in a very sturdy and massive cap, to resist enormous pressure exerted by the tubular system at the terminal, and the massive size of the cap and its stem ensure easy manipulation, even by the robotic maneuvers.

Row to Find the Source of Gas or Oil Leak in the Tubular System, to be Immediately Severed and Replaced—

About the oil-tubing within the rig, and along the course of the oil collecting system throughout, oil (petroleum) sensing and inflammable gas sensing equipment should be placed at equidistance, each equipment also numbered, defining the confines of its territory. When any oil or inflammable gas leak occurs, wherever it originates, its territorial equipment is the one that rings its alarm first, though other alarms also ring later, as the leak spreads around. The devised soft-ware of the computer notes the timing of all the alarms that rang, however, the one that first rang, is the source of the leak (unless the leaks are multiple simultaneously). It can be further confirmed by the adjacently numbered alarms that rang, immediately following it. The computer monitor sets forth the chronology, so that the information is instantly available. The security crew must be very familiar with all the numbered territories, and should approach the concerned tubular confines immediately, severe the leaking part of the tubular, and replace with the instant joint structures. The security crew members on duty should have fire-proof uniform, goggles, masks, and oxygen breathing equipment next to the person, to be able to tackle the emergency as soon as it starts, whatever be its nature. As the joint structures are fixed in their lengths, the length of the tubing, or a complex interconnection that is to be severed, should be properly configured, to fit in the joint structure(s) in the created gap. It can be understood that the insertion of the 'joint structures', most often are aided by I joint(s), the latter conforming to a 'sliding screw' arrangement, by virtue of the tubular system just as the joint structures, having threading throughout. It is a mandate that the crew should have sufficient extent of 'mock practice' involving different tubular configurations, and have sharp 'severance tools', so that a needed interconnection is immediately established. The tubing involved can be the oil collection tubing, the tubular system involving the rig, the tubular system involving the 'Subsea Level Gas Separator of Oil Well Effluent' (SLGOE) unit, and any tubing wherein said configuration is deemed effective. Such structural mandate is as important as all the safety devices incorporated thereof, in case 'well surface blow-out and explosion fire' happen, resulting in a 'disconnect' in the system—when instant joining anywhere necessary is accomplished, or else, instant closing of the system anywhere necessary is similarly accomplished. Said tubing, deployed all through the rig structuring and the well designing wherein the SLGOE is incorporated, ensures an immediate restoration of SLGOE functioning, when a tubing system is disrupted for whatever reasons. It is easy to comprehend that unceasing gas emission from the source of a broken tubular system that cannot be immediately found or mended, is the reason for an unceasing fire. With regard to the instant invention, system upsets at and around, is unintended for the vital purposes of the SLGOE functioning. The devised structural mandate of the tubular system is as important as all the other safety devices put together. Moreover, what needs to be herein implemented is only a simple step forward in means familiar, however, with a big leap in the remedial functions achievable thereof.

The invention claimed is:

1. A preferred prototype model of a 'Subsea Level Gas Separator of Oil well Effluent' (SLGOE) unit, structured about the vicinity of an oceanic oil well, is devised to prevent giant entrainment of inflammable gases from the oil well entering into an oil 'collecting system' of the SLGOE unit, and therefrom into terminal receptacles about a rig, the SLGOE unit embodying the means and methods as set forth below—

(a) an oil 'diversion' tubing, directing admixed effluent from a main oil-collecting tube about a well head, into a set of 3 'gas separator' tanks, each tank receiving an independent oil 'inlet tube' forking from the 'diversion' tubing; the 'diversion' tubing further having provisions thereof for the effluent to initially pass through a 'transition tank', before reaching the 'gas separator' tanks, (b) each of the oil inlet tubes having an open terminal, rising few inches into the 'gas separator' tank, creating a fountain-like up-flow of the effluent (the 'up-flow' model) into the spacious milieu of the tank, aiding instant dissipation of gaseous elements, to be naturally up flowing into large gas outlet pipes about a top of the tank, whereas a downstream collection in the gas separator tank maintaining a level lower than the raised terminal of the oil inlet tube, such volume control about the tank aided through a flow control clamp about its inlet tube, (c) each of the 'gas separator' tanks having perforations to its bottom, the perforations devised to be wider than an incorporated 'production tubing', thereby precluding any block by semisolid components of the effluent, the perforations further letting the down-streaming fountain of the oil-effluent to flow away into a smaller lower compartment having an outlet tube about the bottom, (d) a plurality of widely configured gas outlet pipes about the top letting out the natural up-flow of gases into a gas collecting system, leading to specially designed gas receptacles positioned at a safe distance from the rig, (e) all the outlet tubes of liquid and semisolid effluent about the bottom of the tanks are structured to join a single collecting tube just outside the gas separator tanks, wherein incorporated rubber washers of all the tubing about the SLGOE unit conforming to be of vulcanized rubber, and the tubing itself having threading all through, to facilitate joining or closing of the tubing system following a catastrophic event, whereas specially devised 'closing caps' and 'joint structures' of diverse configurations with complimentary threading aiding the closing or the joining, said 'closing caps' and the diverse 'joint structures' configured to be of far larger dimensions beyond their articulations, for aiding a robotic maneuvering also, (f) the clamp about the oil inlet tube to the tank for controlling volume flow, further aiding in disconnecting the tank by its provision also for an on/off control, only high volume/high production wells subject to operating all the tanks, (g) the SLGOE unit is incorporated into the oil collection system of the oil well, by any feasible means thereof, the ocean grounds about the well head being the most beneficial venue, subject to separating the gas most proximate to the source, past a 'Blow Out Preventer' (BOP) of the well head, said unit also incorporated at the earliest time, to preclude gas entrainment and well blow out, possibly at an earliest occasion about the well operations, (h) the SLGOE unit is configured to be incorporated as the most proximal outlet past the BOP about the well head, so that the force of even a high pressured liquid-gusher with admixed gases of any proportion that the blow out preventer (BOP) occasionally fails to tackle, will be attenuated, to be further tackled by a surface BOY, about the rig, (i) each of the gas separator tanks is equipped to be having a video and/or sonar monitoring device(s), operated by solar battery power source, the video device positioned just outside the tank near its top, and accessing the tank through a window with an air tight automatic door, (j) the SLGOE unit is positioned lower on the oceanic grounds, whereby the terminals of the 'oil inlet tubes' of the 'gas separator' tanks are at a horizontally lower level than the origin of the 'diversion' tubing about the well head, the SLGOE unit, past the 'gas separator' tanks, further incorporating an 'oil passage' tank positioned in an yet lower level, so that the effluent oil from the 'gas separator' tanks flowing into, from its top, to be further returned to the oil collection system about the well head by a 'siphoning' tube originating from the bottom of the 'oil passage' tank, whereas the incoming gaseous components leave through the widely configured top gas outlet pipes, (k) the 'up-flowing' model of 'gas separator' tank(s) of the SLGOE unit are structured at the top with an incorporated 'oil dispersion' device that disrupts any block to the flow downstream, by the semisolid components of the effluent, (l) the SLGOE unit is configured to be structured as a 'SLGOE modular unit' capsule of different preconfigured sizes, to be stationed on the ocean grounds about the well head, wherein: (1) the modular capsule, with its inlet and outlet tubing temporarily capped, is lowered to a wide saucer shaped excavated ocean floor, and in case of un-excavated grounds, the 'oil 'diversion' tube and the 'merging' tulle are set forth at a higher optimal level than the gas separation tanks; (2) a stepwise positioning of the multiple tanks of the SLGOE unit is configured within the modular capsule, while its wheeled base conforms to be horizontal, for an easy and secure stationing onto the oceanic grounds, the unit to be secured by ground fixtures, and further anchored to erected cement slabs, by hooks, rings, or metal bar or rod structures; (3) the modular unit having access to 'drilling conductor' of the well above a base piece of the conductor, said access set forth through an upper terminal of an incorporated 'SLGOE tubular' of the 'SLGOE modular'; (4) the said 'SLGOE tubular' at a lower terminal rests on the ocean grounds, while a lower opening accesses a side wall of the 'SLGOE modular'; (5) the 'SLGOE modular' unit encompassing the 'transition' tank, the 'gas separator' tanks, and the 'oil passage' tank, is made of steel, and stationed at a lower horizontal level than the originating 'diversion' tube about the well head, and (m) the oil inlet tube about the gas separation tank can be designed to enter through the top of the tank, as in a 'down-flow' model or as in a 'hybrid' model, wherein the oil effluent is flowing to its bottom, whereas the instantly dissipated gaseous elements in the spacious milieu of the tank naturally rise to the widely configured gas outlet pipes about the top.

2. The preferred prototype embodiment of the 'Subsea Level Gas Separator of Oil Well Effluent' (SLGOE) unit of claim 1, wherein incorporated into the top of each 'gas separator' tank is an inverted funnel shaped, and spirally wound 'dispersion' coil made of steel, its spiraling string conforming to a malleable caliber of sufficient recoil, the 'dispersion coil' having means and methods as set forth below—

(a) the unit encompassing the 'dispersion coil' being incorporated into a top structure of the tank by two vertical rods, positioned in equidistance about a ring structure attached to the uppermost coil of the string, the rods designed for an axial downward and upward motion, (b) the uppermost coil of the spiral 'dispersion coil' is devised to having a smallest dimension of all the coils, in their circular planes, (c) the spiral coil having its lowermost coil devised to having the widest dimension about the circular plane, (d) when operational, the axial downward motion of the unit, and thereby the spring action of the 'dispersion coil' with an axial downward thrust of all the coils as far as to the bottom of the tank, disrupts any semisolid effluent blocking the bottom perforations of the tank, (e) the uppermost coil of the spiral, configured to be positioned around and in closest proximity to the oil inlet tube, is optimally sized with an inner dimension sufficiently wider than the devised outer diameter of the oil inlet tube, conforming to an easy axial motion of the coil, (f) the incorporated rods of the oil 'dispersion' unit are devised to be positioned outside the 'gas separator' tank, as when the spiral coil is nearer to the top, wherein the axial motion of the rods conform to external controls structured outside the tank, and (g) the oil 'dispersion' unit is devised to be having the axial motion in pre-configured intervals as a continuum, or as required when an outflow block to the tank is suspected.

3. The preferred prototype embodiment of the 'Subsea Level Gas Separator of Oil Well Effluent' (SLGOE) unit of claim 1, wherein incorporated into the top of each 'gas separator' tank is a metal 'dispersion' disc-device made of steel, having means and methods as below—

1. the dispersion 'disc device' when set forth as a 'whole circular' disc, the device is having a configuration of a lamp shade with a perceptible downward incline, as also the disc having a lower surface and an upper surface,
2. the circular disc is supported in a top structure of the tank by two vertical rods positioned equidistance, and attached to the upper surface of the disc about its circumference,
3. the rods having axial motion downward and upward in pre-configured intervals as a continuum, or as required, when an outflow block to the tank is suspected,
4. the circular disc is devised to having a central aperture, the latter with a diameter far wider than the configured outer diameter of the oil inlet tube,
5. the lower surface of the circular disc is structured to have multiple spikes located in a configuration corresponding to the positions of the bottom perforations of the tanks, each spike having a diameter optimally smaller than the perforations,
6. the spikes of the disc positioned nearer to the center are structured longer, whereby all the spikes in their lower free ends are in a same horizontal plane,
7. in an axial downward motion of the disc device, all the spikes are devised to pass through the bottom perforations of the tank, whereby any semisolid crude blocking the perforations is disrupted,
8. the circular disc is sized to be not spreading up to the outer circumference of the tank, to facilitate the dissipating gaseous element from the effluent, to ascend to the top of the tank,
9. the supporting rods are devised to be positioned outside the tank, as when the disc device is nearer to the top, wherein the axial motion of the rods conform to external controls structured outside the tank,
10. the device when made with hemi structures of the disc, it otherwise conforms to similar structural and functional design of the whole circular disc, except that the series of complete upward and downward motion of the hemi structures alternate, and
11. the device, structured either as a whole or as a hemi-device, can be configured as a widely spaced thin net of a grid, about which the spikes are strategically positioned at the bottom.

4. A preferred prototype model of a 'Subsea Level Gas Separator of Oil Well Effluent' (SLGOE) unit of claim 1, wherein the SLGOE unit is devised as a 'down flow' model with no oil 'dispersion' device, and embodying the means and methods as set forth below—

(a) the oil 'diversion' tubing from the main oil-collecting tube about the well head, entering the top of the 'gas-separator' tank through an oil inlet tube far larger than the well's incorporated 'production' tubing, with the effluent flowing down into the tank, (b) the 'gas-separator' tank having an oil 'outlet tube' at the bottom, said oil 'outlet tube' set forth to be far larger than the well's incorporated production tubing', and the gas-separator tank furthermore having a cluster of widely configured gas outlet-tubes all through the available space of the top, the latter to join the gas collection system, (c) the oil from the gas-separator tank flows from its 'outlet tube' at the bottom, to enter the 'oil-passage' tank positioned at a lower level, so that the effluent enters about its top, the 'oil-passage' tank also having a cluster of widely configured gas outlet-tubes about the top, for a complete separation of the remaining gaseous components, (d) the 'oil-passage' tank furthermore having a 'syphoning' tube rising from the bottom of the oil effluent column, to reach the oil collection system about the well head, as a 'merging' tube, joining above the 'diversion' tube, and (e) the down-flow model of the SLGOE unit otherwise conforming to the design of the up-flow model, is configured in the 'SLGOE modular' set forth on the oceanic wounds, and connected to the oil collection system about the well head, through the 'SLGOE tubular'.

5. A preferred prototype model of a 'Subsea Level Gas Separator of Oil Well Effluent' (SLGOE) unit of claim 1, wherein the said SLGOE unit devised as a 'hybrid' model, incorporates the elements of both the up-flow and the down-flow models in part, embodying the means and methods as set forth below—

(a) the gas separator tank has the oil 'diversion' tube entering as the top oil inlet tube, with oil down-flowing to the bottom, (b) the gas separator tank has an incorporated 'oil-dispersion' device at the top, (c) the gas separator tank has a sieved bottom, with the oil outlet tube emerging from a lower compartment that diverts oil into the 'oil passage' tank, located at a lower level, (d) the gas separator tank has a cluster of widely configured gas outlet tubes at the top, (e) the 'oil passage' tank has a 'siphoning' tube rising from the bottom oil column of the tank, to reach the well-head's oil collection system, joining as a 'merging' tube, (f) the 'oil passage' tank also having widely configured gas-outlet-tubes at the top, (g) the devised 'hybrid' model of the SLGOE unit otherwise conforming to the design of the up-flow model, is configured in a 'SLGOE modular' set forth on the oceanic grounds, and connected to the oil collection system about the well head, through the 'SLGOE tubular'.

* * * * *